United States Patent [19]

Kirkman

[11] 4,436,378
[45] Mar. 13, 1984

[54] PASSIVE DISPLAY MODULE AND SYSTEM

[75] Inventor: David H. Kirkman, Winchester, England

[73] Assignee: International Business Machines Corporation, Armonk, N.Y.

[21] Appl. No.: 307,914

[22] Filed: Oct. 2, 1981

[30] Foreign Application Priority Data

Dec. 31, 1980 [EP] European Pat. Off. ......... 80304781.0

[51] Int. Cl.³ .............................................. G02F 1/17
[52] U.S. Cl. .................... 350/345; 350/357
[58] Field of Search ............... 350/345, 353, 357, 355, 350/359; 362/19, 23, 26, 31; 40/361, 362, 363

[56] References Cited

U.S. PATENT DOCUMENTS

| T938,006 | 10/1974 | Stephany | 350/342 |
|---|---|---|---|
| 4,195,915 | 4/1980 | Lichty et al. | 350/345 |
| 4,212,048 | 7/1980 | Castleberry | 350/345 |
| 4,277,817 | 7/1981 | Hehr | 350/345 |

FOREIGN PATENT DOCUMENTS

| 1912 | 5/1979 | European Pat. Off. . |
| 6361 | 1/1980 | European Pat. Off. . |
| 42893 | 1/1982 | European Pat. Off. . |
| 2246074 | 5/1973 | Fed. Rep. of Germany . |
| 2237084 | 2/1974 | Fed. Rep. of Germany . |
| 2552278 | 5/1977 | Fed. Rep. of Germany . |
| 7242748 | 7/1973 | France . |
| 1401066 | 7/1975 | United Kingdom . |
| 1442249 | 7/1976 | United Kingdom . |

OTHER PUBLICATIONS

Report AD-A048198/6SL Aug. 1977 for U.S. Government "Liquid Crystal Airborne Display" by Winner et al (Hughes Aircraft).
IBM Technical Disclosure Bulletin, vol. 22, No. 11, Apr. 1980 p. 5062.

Primary Examiner—James W. Davie
Attorney, Agent, or Firm—Joseph E. Kieninger

[57] ABSTRACT

A passive display module for use in a display system having a source of illumination and a projection lens includes a liquid filled cell having a transparent top and a wall surrounding a display electrode area. A side light guide, coextensive with the display area, forms or abuts one wall of the cell and directs light from the source onto the display area. The guide has a reflective upper inclined surface for reflecting light onto the display area and for preventing light from the source from escaping directly to the projection lens. A reflective coating is also provided on an outer face of the remaining portion of the cell wall which is inclined inwardly to return escaping light to the system.

9 Claims, 3 Drawing Figures

PASSIVE DISPLAY MODULE AND SYSTEM

FIELD OF THE INVENTION

The present invention relates to passive display modules and systems and more particularly to passive display modules of the liquid filled cell type and to systems employing such modules in conjunction with a lens arrangement and a source of light.

BACKGROUND OF THE INVENTION

There are three types of passive display employing liquid filled cells, namely, liquid crystal displays, electrochromic displays and electrophoretic displays. By "passive display" is meant a display which is not light generating but is visible only when illuminated by an external source. All of these employ display electrodes, energisation of which causes an optically perceptible effect on or around the electrodes. Although many of these displays are viewed directly in natural light, there is often a need to provide additional illumination particularly if an image of the display is to be projected through a lens arrangement.

Some displays may be illuminated and viewed by transmitted light. An example of such an arrangement for a liquid crystal cell is shown in U.K. patent No. 1,442,249 (K. K. Daini Seikosha). However, the use of light transmission imposes considerable limitations on the structure and materials of the cell itself in that much of the cell must be transparent or at least translucent.

Accordingly, many displays are illuminated and viewed in reflected light. One arrangement for illuminating and projecting a liquid crystal display in reflection is shown in U.S. Defensive Publication T938006 (Stephany). Light from a collimated source is totally internally reflected by the oblique face of a right-angled prism onto a liquid crystal cell. Light reflected from the cell passes through the oblique surface and is focussed by a lens onto an imaging screen.

A report No. AD-A048198/6SL (August 1977) for the U.S. Government entitled "Liquid crystal Airborne Display" by R. N. Winner, M. N. Ernstoff and W. R. Byles, of Hughes Aircraft Corporation, shows the illumination of a liquid crystal display by means of a wedge prism of small apex angle placed on its side above the display. A source of light is provided near the base of the prism and it is shown that, after multiple internal reflections, bands of light emerge from the side faces of the wedge prism. The downwardly directed bands illuminate the cell so that it can be viewed in reflected light.

An article entitled "Improving the Efficiency and Image-Uniformity of a Simple Reflective Light Valve Projector" by A. G. Dewey (IBM Technical Disclosure Bulletin, Volume 22, Number 11, April 1980, page 5062) shows, inter alia, the use of a beam splitter to direct light from a condenser lens onto a "light-valve". Reflected light from the light valve then passes through the beam splitter to a projection lens.

The illumination systems proposed in the abovementioned prior art have the disadvantage, from the point of view of projection, of taking up space over the cell top which restricts the entrance pupil of the projection lens. A further specific disadvantage of the beam splitter arrangement is that the incident light intensity is reduced by a factor of approximately four by the beam splitter itself before it reaches the projection lens. The wedge and prism alternatives have the specific disadvantages of introducing an offset of the optic axis of the display and also producing chromatic aberration.

SUMMARY OF THE INVENTION

It is a primary object of this invention to provide an improved passive display module and system.

It is another object of this invention to provide a passive display module that does not restrict the entrance pupil of the projection lens.

It is still another object of this invention to provide a passive display system having a relatively high incident light intensity.

It is yet still another object of this invention to provide a beam splitter-free passive display system.

It is a further object of this invention to provide a passive display system that is relatively free of chromatic aberrations.

Accordingly the present invention provides a passive display module including a liquid filled cell, the cell comprising a display electrode area in the base of the cell in which area information is optically displayed by selective activation of the display electrodes, a wall around the display electrode area and a transparent top to enclose the liquid in the cell. The system further comprises a side light guide coextensive with the display electrode area in one dimension and having an inner face which either abuts or forms part of the wall of the cell, an outer face for receiving light from an external source and a reflective upper surface inclined downwardly towards the display electrode area. In a preferred embodiment one or more of the following features are included; the outer face of the side light guide is diffusing; the outer face of the side light guide is larger than the inner face so that the guide tapers toward the cell; the upper surface of the side light guide is coated so that it is reflective; and that the cell wall be surrounded by a reflective surface inclined inwardly towards the display electrode area from the normal to the cell base.

Other objects and advantages of this invention will be apparent from the following detailed description, reference being made to the accompanying drawing wherein a specific embodiment of the invention is shown.

DESCRIPTION OF THE PREFERRED EMBODIMENT

Figure 1:
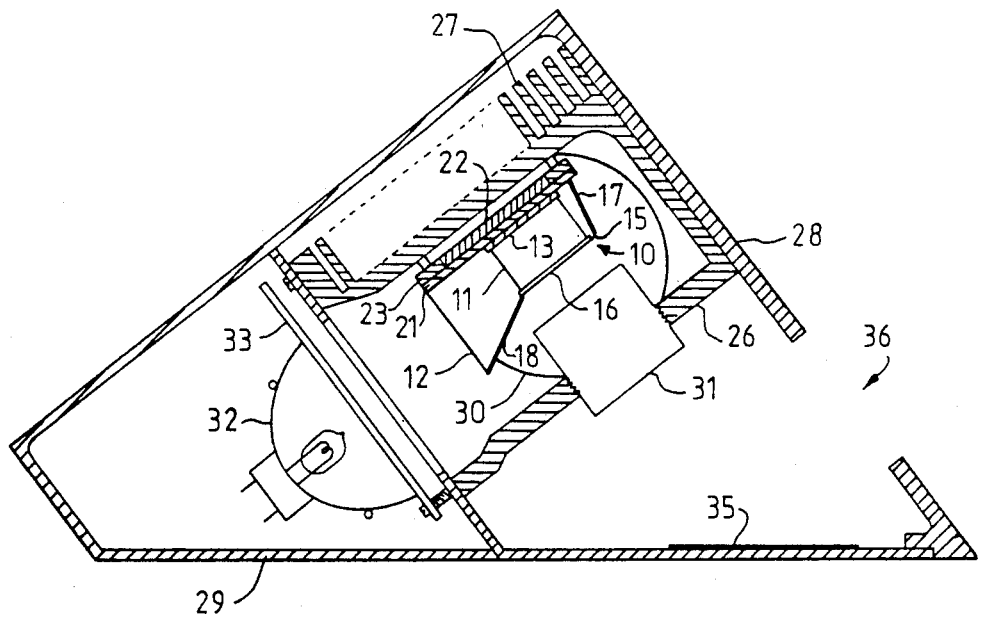
FIG. 1 shows a side sectional view of a passive display module and system according to the present invention.
Figure 2:
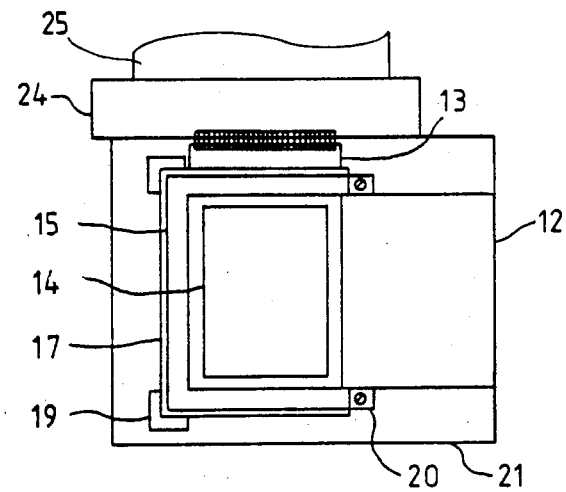
FIG. 2 shows a plan view of the passive display module of FIG. 1.

The display system of FIG. 1 employs an electrochromic display module 10 comprising a cell 11 and side light guide 12, also shown in FIG. 2. The cell 11 is filled with a solution of an electrochromic material. The base of the cell is formed by a silicon wafer substrate 13 on which is an array 14 of matte silver display electrodes each selectively energisable by means of a field effect transistor beneath the electrode in the silicon substrate. The construction of such a silicon integrated display array is described in more detail in our European Patent Application No. 80302193.0.

The electrochromic material employed is one of the so-called viologens, specifically a 1,1′di-n-heptyl 4,4′bipyridinium phosphate/hypophosphite mixture as described in our published European Patent Application No. 00001912. When an appropriate current is passed between selected ones of the display electrodes and a counter electrode (not shown), the viologen, in aqueous solution, is reduced to the radical cation and precipitates as the purple coloured phosphate or hypophosphite on the electrodes.

The cell 11 has a wall 15 surrounding the display area 14 on three sides and a top 16 both of which are made of the same transparent acrylic material as the light guide 12. The inner face of light guide 12 forms the fourth wall of the cell. The outer face 17 of wall 15 is inclined towards the display array 14 at an angle of about 10° to the normal to the array. Both the inclined surface 17 and the top surface of the wall 15 are metallised to reflect light as also is the inclined surface 18 of the guide 12.

Feet 19, formed at the corners of wall 15, and support posts 20 bonded to the wall 15 and light guide 12 allow the cell to be mounted on a copper plate 21 in thermal contact therewith. Beneath the copper plate is a Peltier cooler 22 for controlling the temperature of the cell, mounted in a frame 23.

As can be seen in FIG. 2, the silicon wafer 13 passes beneath the wall 15 at one side of the cell and conductor lines (not shown) on the wafer are electrically connected by means of fine wires to a printed circuit board 24 to the other side of which is plugged a cable 25.

The module is bolted by means of the frame 23 to a channel shaped aluminium casting 26, provided with cooling fins 27, which is bolted to the metal frame of the display system. The frame consists of a cast portion 28 and a sheet metal portion 29. Additionally, the frame supports a fan 30 for forcing cooling air over the module and casting 26.

A lens assembly 31 is supported by the casting 26 immediately above the transparent top 16 of the module. A projection light source 32 for illuminating the display is mounted on a support plate 33 bolted to frame portion 29. A mirror 35 is mounted above the lens assembly to direct the projected light out of a slot 36 onto a screen (not shown).

Figure 3:
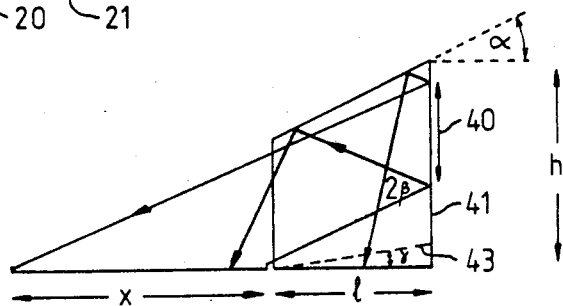
FIG. 3 illustrates the path of light rays in one specific configuration of the module of FIGS. 1 and 2.

The light source 32 is a commercially available tungsten halogen lamp (Thorn Lighting Type M37) having an ellipsoidal reflector and a filament at one focus of the ellipsoid. Neglecting light emitted forwards, directly from the filament, this lamp produces a convergent beam of light which forms an image of the filament at the second focus of the ellipsoid. The lamp is so positioned that, as shown in FIG. 3, the image 40 (indicated by an arrow) is formed on or very near the outer face 41 of the light guide which may have a light diffusing surface. The distance from the face of the lamp to the face 41 is in the range of 19–35 mm and the image is a spot 7–10 mm in diameter. The light rays from the image fall within a cone of half angle $\beta = 35°$. The spot is centred on the upper part of face 41. In the particular example of FIG. 3, the spot centre is 10.8 mm above the base of the guide whose outer face height "h" is 16.5 mm. The inner face of the guide is 10.6 mm high and its base length, "l", is 13 mm, corresponding to an angle $\alpha$ of 25°. These dimensions were selected, for the particular light source, in order to illuminate a display area of width $x = 21$ mm. The dimensions chosen are also affected by the refractive indices of both the acrylic (1.49) and of the electrochromic solution (1.36).

Of course, many variations of the shape of the light guide and reflective wall are possible depending on the source used and the target area to be illuminated. Where a display area with $x = 11$ mm was to be illuminated it was found advantageous to reduce the angle, $\alpha$, of the guide to 16° and also to incline a portion of the lower face of the guide, from a point 1.5 mm back from the inner face, at an angle $\gamma = 14°$ as shown by the dotted line 43 in FIG. 3. The height of the inner face remained 10.6 mm and the overall length 1 was 12 mm.

Extreme light rays from the ends of the focussed image and at the maximum angle $\beta$ are shown in FIG. 3. Most rays lying between these extremes reach the display electrode area on the silicon wafer. However, it is clear that not all will do so and it is important to prevent such rays from escaping upwardly into the projection lens. For this reason only the upper surface of the guide (corresponding to surface 18, FIG. 1) is metallised but the lower surface is not. The reflective surface 17 (FIG. 1) of the cell wall 15 reflects not only rays which have missed the display area back into the module but also returns some rays which have been scattered from the display area in directions outside the entrance pupil of the projection lens. Thus, some light which would otherwise have been lost or which would have caused background glare in the projection system is reflected back into the module. A proportion of this returned light will, in fact, reach the display area to produce useful illumination.

Experimental measurements of the efficiency of side light guides such as those discussed above with reference to FIG. 3 have shown that 33% of the total lamp output reaches the display area. The brightness, at the display area, as measured with a spot meter over the 11 mm wide display area, varied from $10^4$ to $1.6 \times 10^4$ cd.m$^{-2}$. This variation is almost undetectable by the human eye. Without the light reflected back by the inclined face 17 of the cell wall, the efficiency would drop by roughly 3–4%.

Many variations of the systems illustrated in FIGS. 1 to 3 are possible without departing from the principles of the invention. As has been noted, the geometry and dimensions of the side light guide can change considerably depending on the target area, the light source employed and the refractive indices involved. Clearly other transparent material, e.g. glass, could be employed instead of the acrylic shown.

By permitting illumination of a liquid filled display cell through a side wall, reflective projection of the image may be achieved without the above mentioned disadvantages. The arrangement affords reasonably uniform illumination over the display electrode area but uniformity can be improved by making the outer face of the side light guide diffusing. This module structure is also compact and rugged.

To gather the maximum light available from the source, it is preferable that the outer face of the side light guide is larger than the inner face so that the guide tapers towards the cell. This feature is particularly useful for the illumination of miniature displays in which the light source is larger than the guide and cell.

It is also preferable that the upper surface of the side light guide be coated to render it reflective to prevent light escaping upwardly and reaching the projection lens to cause wash out of the projected image because of background glare. Of course, depending on the refractive indices and light paths involved, this may, in some cases, be achieved by total internal reflection alone.

The escape of any light from the cell sides is wasteful and could also contribute to a washed out image. It is thus a preferred feature of the invention that the cell wall be surrounded by a reflective surface inclined inwardly towards the display electrode area from the normal to the cell base.

The side light guide of a display module according to the invention is particularly useful with the electrochromic type of passive display which can have a deeper and less critically dimensioned film of liquid in the cell than a liquid crystal display. The deeper the cell, the greater is the area of the side of the cell through which illuminating light can pass and the less oblique are the angles of illumination. Electrochromic displays are known in which the display electrodes have matte surfaces which are good scatterers of light. The intensity of reflected light from such displays is not of course strongly dependent on the angle of incidence of the illuminating light and thus such displays are particularly suited to the sidewall illumination technique of the invention where the angles of incidence are necessarily oblique.

The invention is not confined to the display module alone but also encompasses an entire display system including such a module and in which a lens arrangement is located above the transparent top of the cell and a source of light is directed onto an upper portion of the outer face of the side light guide. This arrangement increases the amount of light reaching the display area and reduces the amount of light which is lost.

Where it is desired to project the light from the display onto a screen, it has been found preferable to employ as the light source a lamp with an ellipsoidal reflector and a filament at one focus of the ellipse, the lamp being located such that the second focus of the ellipse falls in the region of the outer face of the light guide.

This type of source concentrates the light into a spot of relatively limited extent on the outer face of the guide and also produces a beam whose rays have only limited angular divergence. Both these attributes mean that relatively little light is lost and that a high proportion reaches the display electrode area.

Furthermore although an electrochromic display has been illustrated, the invention is also applicable to the other forms of passive display mentioned.

I claim:

1. A passive display module for use in a display system having a source of illumination and a projection lens comprising:
   a counter electrode,
   a display electrode area,
   a liquid filled cell having a transparent top portion and a wall surrounding said display electrode area,
   a side light guide coextensive with said display electrode area in one dimension, said guide having an inner face forming at least a part of said wall and an outer face for receiving light from an external source, said guide having a reflective upper surface inclined downwardly towards said display electrode area.

2. A display module as claimed in claim 1 in which said outer face of said side light guide is larger than said inner face so that said guide tapers towards said cell.

3. A display module as claimed in claim 1 in which said upper surface of said side light guide is coated to render it reflective.

4. A display module as claimed in claim 1 in which said cell wall is surrounded, except where it is coextensive with said light guide, by a reflective surface inclined inwardly towards said display electrode area.

5. A display module as claimed in claim 1 in which said outer face of said side light guide is light diffusing.

6. A display module as claimed in claim 1 wherein said display electrode area has a light scattering surface.

7. A display module as claimed in claim 1 including a lens arrangement located above said transparent top of said cell and a source of light directed onto said upper portion of said outer face of said side light guide.

8. A display module as claimed in claim 7 in which said light source is a lamp with an ellipsoidal reflector and a filament at one focus of the ellipse, the lamp being located such that the second focus of the ellipse falls in the region of the outer face of the light guide.

9. A passive display module including a liquid filled cell, the cell comprising a counter electrode, a display electrode area in the base of the cell in which area information is optically displayed by selective activation of the display electrodes, a wall around said display electrode area and a transparent top to enclose the liquid in said cell, characterised in that said module further comprises a side light guide coextensive with said display electrode area in one dimension and having an inner face forming at least a part of the wall of said cell, an outer face for receiving light from an external source and a reflective upper surface inclined downwardly towards said display electrode area.

* * * * *